United States Patent [19]

Miyagawa et al.

[11] Patent Number: 4,555,801
[45] Date of Patent: Nov. 26, 1985

[54] PATTERN DISCRIMINATOR

[75] Inventors: Michiaki Miyagawa, Hachiooji; Kouichi Ohki, Tokyo; Matsuhiko Takaya, Hino; Naoto Fujihara, Hino; Tadayuki Yamada, Hino, all of Japan

[73] Assignee: Fuji Electric Co., Ltd., Japan

[21] Appl. No.: 691,164

[22] Filed: Jan. 14, 1985

Related U.S. Application Data

[62] Division of Ser. No. 483,505, Apr. 11, 1983.

[30] Foreign Application Priority Data

Apr. 30, 1982 [JP] Japan ................................. 57-71498
Apr. 30, 1982 [JP] Japan ................................. 57-71499
Apr. 30, 1982 [JP] Japan ................................. 57-71500

[51] Int. Cl.$^4$ ............................................. G06K 9/36
[52] U.S. Cl. ......................................... 382/44; 382/45
[58] Field of Search ........................ 382/44, 45, 46, 47, 382/48

[56] References Cited

U.S. PATENT DOCUMENTS 3,710,323  1/1973  Andrews et al. ..................... 382/45

*Primary Examiner*—Leo H. Boudreau
*Assistant Examiner*—Michael M. Murray
*Attorney, Agent, or Firm*—Brumbaugh, Graves, Donohue & Raymond

[57] ABSTRACT

A pattern discriminator receives scanning data obtained by raster scanning objects within predefined window regions with a photoelectric converter, converts the scanned data into pixel binary data by using a threshold value dependent upon the scanning position and window region and evaluates the binary data in accordance with predetermined criteria to produce an output signal indicative of the evaluation. Data specifying the shapes of the desired window regions approximated by polygons is obtained by specifying the apexes of the polygons and a programmed CPU computes the coordinates of each picture element or pixel on the lines connecting adjacent apexes along each window region perimeter. A memory stores the apex and coordinate data which defines the starting and ending points of each window region. Polygonal masks within each window and submask polygonal window regions within each mask can be defined in a similar manner. A shifting detector and position corrector detects the amount of any positional shift of an object being scanned in relation to the position of a previously scanned reference object, and shifts the locations of the defined window regions by the amount of the positioned shift detected.

5 Claims, 24 Drawing Figures

PATTERN DISCRIMINATOR

This application is a division of application Ser. No. 483,505, filed on Apr. 11, 1983.

BACKGROUND OF THE INVENTION

This invention relates to a pattern discriminator having a photoelectric converter of the two-dimensional sequential scanning type for scanning an optical image and for producing time based electrical signal outputs representing the scanned image, a binary converter circuit for dividing electrical signal into picture elements or pixels and for outputting the signals in the form of binary values, means for setting up at least one window region within an area corresponding to a field of vision of the photoelectric converter, and means for evaluating the binary outputs in each window region in order to recognize the pattern using the measured characteristic magnitudes.

FIG. 1 is a block diagram illustrating the configuration of a conventional pattern discriminator with a video camera. In FIG. 1, the pattern discriminator comprises a video camera 1, a binary converter 2, a window pattern generator 3, a binary data memory 4, a CPU (central processing unit) 5, a window pattern-setting assembly 6, and a television monitor 7.

During operation of this conventional device, composite video signals that the video camera has obtained by scanning a pattern are digitally processed by the binary converter 2 to obtain binary value data for picture elements (e.g. pixels). The data are taken out through an AND gate A1, which receives opening signals for only a fraction of the time interval as selected by the window output of the window pattern generator 3, and only the selected data in the window region are stored in the binary data memory 4. The data are then retrieved from the memory 4 and used to evaluate the pattern in CPU 5. Data from the binary converter 2 and the window output from the window pattern generator 3 are given to the television monitor 7 through an OR gate OR1. Therefore both the pattern and the window region previously set up for the pattern can be monitored.

FIG. 2 is a block diagram illustrating in more detail the conventional window pattern generator 3 heretofore employed in the pattern discriminator shown in FIG. 1, and consists of an X counter 15X, a Y counter 15Y, and comparators 16, 17. FIG. 3 is an explanatory view of the monitor television 7 shown in FIG. 1.

During operation of this conventional device, the counter 15X outputs an abscissa signal of representing the abscissa scanning position on the screen 11 while counter Y outputs ordinate signals. Desired abscissas and ordinates have been previously set up in window-pattern-setting assemblies 6X and 6Y, respectively.

In the comparator 16, the output of the X counter 15X is compared with the preset value in the setting assembly 6X, and a horizontal window output signal 9 is produced only during a period of time that these two outputs conform to each other. In the comparator 17, the output of the Y counter 15Y is compared with the preset value in the setting assembly 6Y, and a vertical window output signal 10 is produced only during a period of time that these two outputs conform to each other. The window-generating signals 9 and 10 are inputted to an AND gate which generates a window output 12 representing a quadrilateral window region.

In examining patterns, it is very important to be able to set up a window region which limits the region under examination and to be able to generate window patterns having a variety of shapes. However, one of the disadvantages of the conventional methods of generating windows is that they have beem limited to quadrangles. The only method of producing other shaped windows having triangular, rhombic, polygonal, circular or other window patterns is to use PROM's (programmable read-only memories) which store the coordinates of the window pattern shapes in the setting assembiles 6X, 6Y shown in FIG. 2. However, this method is not flexible enough to produce windows of other shapes or dimensions.

FIG. 4 is a block diagram of a conventional pattern discriminator slightly different from what is shown in FIG. 1. In FIG. 4, the components shown include an analog-digital converter (A/D converter) 101, an image memory 102, a data collector 103, a decision processor 104, a selector 105, a setting assembly 106, and a multi-window region generator 107.

During operation of this device, an analog signal A from an iTV (industrial television) camera or other photo-electric converter of the two-dimensional sequential scanning type outputs time based electrical signals after scanning an optical image of a pattern being examined (not shown). These signals are given to the A/D converter 101 which includes a picture-element-dividing circuit (pixel divider), binary converter circuits and the like, which convert the signals into binary values according to a preset threshold level and divide the signal into picture elements (pixels) which are then stored in the image memory 102.

However, the analog signal that the iTV camera has obtained by scanning the optical image of the pattern being examined may fluctuate greatly depending on the degree of illumination of a particular region of the optical image and so on for binary conversion in the A/D converter 101. Therefore, use of the same threshold level for the whole region of the picture plane optical image may make it impossible to obtain a proper binary output. Accordingly, the analog signal is converted into several binary signals using different threshold levels, and each of the binary value signals is stored in the memory 102.

The multi-window generator 107 generates a signal which specifies a plurality of particular window regions to be specifically examined within the whole region of the picture plane optical image. Data selected by the selector 105 is received in the data collector 103 and, based on that selection, the window region (hereafter also referred to as simply a window) specified by the multi-window generator 107 is set up, and the outputs of data are produced by the collector 103 on a set window basis. The data generated is compared with reference data that has previously been inputted by the setting assembly 106 in the decision processor 104 and, based on the result of comparison, a decision output signal Y is produced.

In the conventional pattern discriminator thus constructed, the window region specified by the multi-window generator 107 is set up in a certain fixed location within the region corresponding to a field of vision of the iTV camera. For this reason, if the pattern being examined slips in the visual region, the window region will be improperly located and may result in an incorrect decision being made by using incorrect data. This problem will be described further in conjunction with FIGS. 5 and 6.

FIG. 5 is a plan view of the visual region of the iTV camera, showing an image of an object 111, a window 112, and a screen 113 of the iTV. In FIG. 5, it is assumed that the camera carries out horizontal scanning in the X direction. The signal obtained by the camera scanning the image of the object 111 on the horizontal scanning line having an ordinate Y1, is shown by FIG. 6(a). If the signal is converted into a digital or binary signal through a binary converter circuit like a comparator, it will become what is shown by FIG. 6(b). However, if the object 111 moves sideways and/or vertically in the X and/or Y direction, the output data obtained by scanning the inside of the fixed window 112 shown in FIG. 5 (for instance, N) may become too large or small, thus making it impossible to obtain reliable data on the characteristics of the image of object 111. Therefore, a decision after examination will likely be wrong or impossible to make.

One attempt to solve the shifting problem is by the use of reference points. A conventional method of determining reference locations in the optical image will be given with reference to FIG. 7, which is a plan view of a picture area 201 and an image 202 of an object. The location of image 201 within picture area 201 is represented by rectangular coordinates X and Y. Scanning by the camera is carried out in the horizontal (X) and vertical (Y) directions. The waveform of a photoelectric signal obtained by scanning the picture area along a straight line L on the ordinate Y1 is indicated in FIG. 8(a), and the binary output is shown by FIG. 8(b).

Referring now to FIG. 7, the location of the image 202 of the object in the picture area 201 can be represented by, for instance, a reference point S at the upper left corner of the image 202, provided that the shape of the image of the object is constant and known, and the ordinate and abscissa of the point S are obtainable.

Image processing techniques are often employed in inspection operations. For instance, suppose rectangular objects having the same shape as the one 202 shown in FIG. 7 are sequentially carried by a conveyer belt. A certain good object may be first scanned by an iTV camera and the results of the scan may be stored in a memory. Other objects carried by the conveyor can then be scanned, and by comparing the results of these other objects with those stored in the memory, one can determine whether certain characteristics of the subsequent objects are good or bad.

When such a comparison is made for inspecting purposes, if the location of the image of a subsequent object in the picture area shifts relative to the first scanned object a simple comparison may cause the subsequent object to be erroneously classified as a bad object. If the coordinates of the image reference point (S) 202 of an object shown in FIG. 7 are readily obtained in the image of an object subsequently sent in, one can effectively modify the location of the subsequent object using the coordinates so that a good comparison can be made. A comparison can be made as though the locations of two images in the picture area are the same, thus avoiding an erroneous decision.

In this context, one prior method for obtaining a certain reference location of an object within a picture area by carrying out horizontal and vertical scanning using an iTV camera to locate the point where the first image signal appears on the scanning line, and then by defining the abscissa X and the ordinate Y of this point as the coordinates of the reference point S. However, this prior art method has several disadvantages. In the first place, because the first or leading location is selected to be reference point S of the object image, if noise is contained in the signal, the location at which the noise appears is may be wrongly judged the abscissa of the reference point S. As shown in FIG. 9, if an area of noise 203 in addition to the image 204 of the object is located in a picture area as shown in the figure, the ordinate Y1 and abscissa $a_1$ ($a_1$ being the abscissa of the tip of the noise 3) obtained by scanning the noise 203 may be misjudged the coordinates of the first point of the image.

Another disadvantage lies in the fact that, because the ordinate of the first point of the image is determined according to the discovered ordinate, an error in the ordinate may become greater depending on the shape of the image. In this context, as shown in FIG. 10, when the image 205 of an object has a complicated pincushion shape in the X direction in its upper portion, the abscissa of the point moves a significant distance from x1 to x2 even though the ordinate on the scanning line in the Y direction moves from Y1 to Y2 or by only one line. For this reason, for images of objects having such shapes, the error in the ordinate of the first point may be greater. Examples of objects having shapes which may present this type of problem include electrical connectors, ICs with projecting pins, and feathers. The disadvantage of making the error in the ordinate greater exists not only in the shape shown in FIG. 10 but also in a circularly shaped image 206. FIG. 11 illustrates that a change $\Delta X$ in the abscissa direction amount is greater as compared to a change $\Delta Y$ in the ordinate direction for such an object.

Generally speaking, it is very difficult to make the intensity of illumination within the vision of a camera (or a picture area to be picked up) uniform. Accordingly, depending on the location of the object's image within the region, some levels of the image signal may correspond to background or noise, and in these places it is difficult to detect an edge at the boundary between the image and its background. On the other hand, a portion where the level of the image signal often differs greatly from the background and the edge detection can be readily made. However, in the conventional method the abscissa of the first point of the image of the object is also used as the location for detecting its ordinate. Because this method lacks flexibility from a positioning standpoint, a further disadvantage is that the error becomes greater when the leading location is hard to detect.

One proposed apparatus for determining a reference location of an image in a picture area in order to improve the drawback just described is disclosed in Japanese application No. 195671, 1981. According to this application, the coordinates of a reference point representing a reference location of an image of an object in terms of X and Y are not chosen to be the ordinate and abscissa coordinates of a single point in a picture area. Instead, the ordinate and abscissa of such a reference point are determined separately by selecting a location which minimizes error depending on the shape of the particular object. Moreover, the ordinate is determined only when the image signal level exceeds a preset first threshold level for a preset period during a period of scanning in the X direction. The abscissa is determined by selecting a location substantially free from an error where the detection of an edge can readily be made by using the abscissa of a leading location where the pickup signal begins to exceed a second threshold level and maintains that level during a period of scanning in the Y direction.

The description of the apparatus for determining the reference location of the image according to the proposal will be further given in conjunction with FIGS. 9-1 and 9-2. FIG. 9-2(a) illustrates a binary output waveform of a pickup signal obtained when scanning is carried out along the horizontal line L1 in FIG. 9-1 for the ordinate coordinate Y1. Similarly, FIG. 9-2(b) illustrates a binary output waveform of a pickup signal obtained when scanning is carried out along the horizontal line (including the point S, b3) along the ordinate coordinate Y2. Moreover, in FIG. 9-1, the first point S for obtaining the ordinate is determined as the point where the level of the pickup signal obtained by carrying out scanning along the horizontal scanning line which includes the point S exceeds the preset threshold level at least over the distance N. Thus, as shown in FIG. 902(a), this prevents a wrong decision regarding the noise 203 and the projections a2-b2 of the image as the first points. This method determines the ordinate.

Assuming the image 207 of the object has a shape shown in FIG. 12, the ordinate in the end region S1 may be easily determined as Ys by the use of the above method, but it is then difficult to obtain its abscissa. However, a look at the shape of the image 207 reveals that the abscissa remains constant against the fluctuation of the ordinate in the region S2 separated from the region S1 by ordinate distance $Y_1$ and that this abscissa may be obtained without errors. In the region S2, if the first point $X_1$ obtained by horizontal scanning exceeds a preset threshold level is chosen as the reference abscissa, errors will be minimized. In addition, the threshold levels used to determine the ordinate and the abscissa are each determined depending on the actual condition of the signal level in each region. However, in practice, the coordinates can not always be properly determined using this method.

SUMMARY OF THE INVENTION

The present invention has been made to eliminate various disadvantages of the prior art, and an object of the present invention is to provide a novel method for generating windows, wherein windows having virtually any shape and dimension can be generated freely and quickly.

The present invention includes means for generating windows by approximating its shape by an N-sided polygon and by sequentially specifying the locations of the N-apexes, means for generating data representing the N-apexes, means for computing the coordinates of each picture element on the straight lines connecting adjacent apexes along the polygon perimeter by straight line interpolation, and memory means for storing the apexes and coordinates of each picture element thus computed, whereby N-sided polygonal windows having any desired polygonal shapes can be generated using coordinate outputs stored in the memory.

According to another form of the invention, a pattern discriminator comprises means for obtaining data on the characteristics of an image of an object even if the image within a field of vision of a camera shifts from a preset location, by detecting the direction and amount of shifting so that data on the characteristics are reliable enough to examine the image of the object and to ensure that a proper decision is made and by correcting the location of setting up a window. This arrangement according to the invention includes means for setting up a window region by determining the abscissa and ordinate of a reference location for the shape of the image in a picture area, and for defining the coordinates referring to binary signals of the outputs obtained by scanning the region involved.

DETAILED DESCRIPTION OF THE PREFERRED EMBODIMENT

FIG. 9-1 is a plan view of a picture area which includes noise;

FIG. 9-2 is a waveform chart of a binary signal of a pickup signal obtained from scanning the picture area in FIG. 9;

DETAILED DESCRIPTION OF THE PREFERRED EMBODIMENTS

Examples of the present invention will be described starting with FIG. 13, which is a block diagram illustrating an example of a pattern discriminator using a window generating method for setting up a window having virtually any desired shape by using polygonal approximations.

Figure 13:
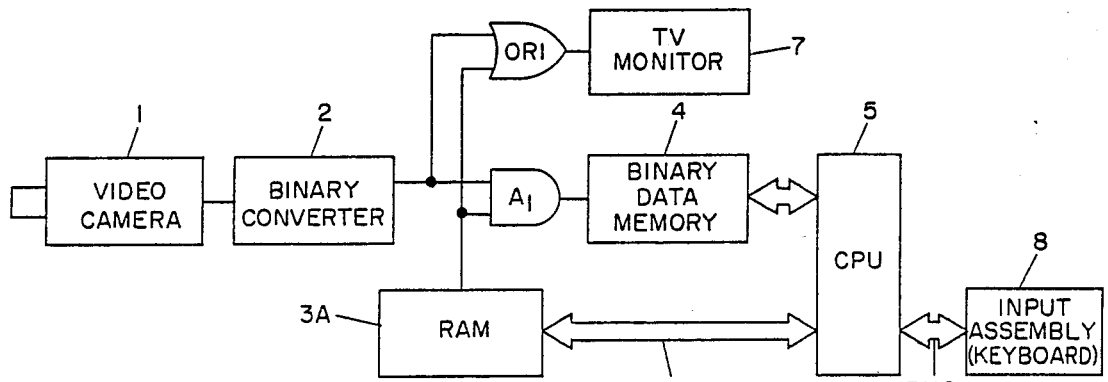
FIG. 13 is a block diagram illustrating the arrangement of one example of a pattern discriminator for generating windows according to the present invention.
Figure 14:
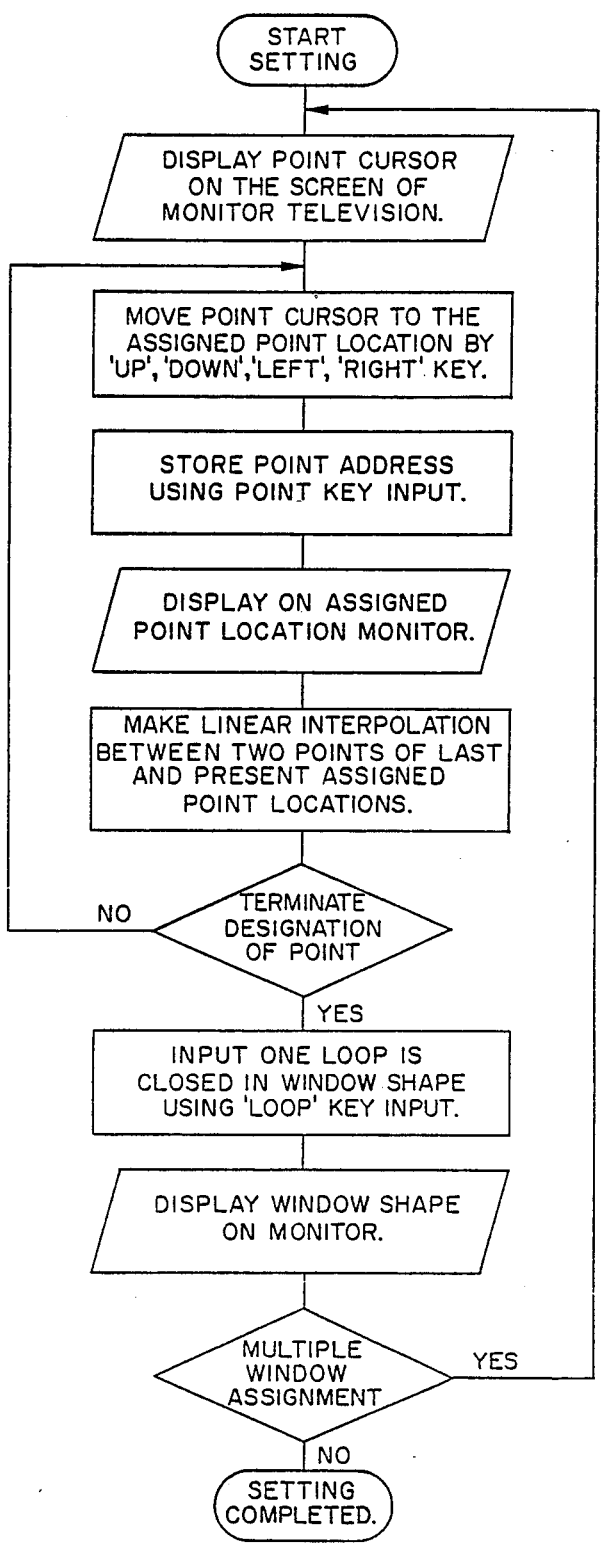
FIG. 14 is a flow chart of the operation of a pattern discriminator according to the invention.

In FIG. 13, a RAM (not shown) used for the window pattern generator 3A is connected to CPU 5 by a bus B, and an input assembly 8 is provided in the form of a keyboard. An algorithm for controlling this CPU is shown in a flow chart in FIG. 14.

According to the invention, an operator defines window regions on a screen by inputting data on the locations of apexes of a polygon which approximates the window regions desired. Data on each window region is inputted separately. For an N-sided polygon (N being greater than 2), data on N apexes must be inputted.

An operator gives instructions for setting up windows to the CPU 5 by way of the key-input assembly 8. Subsequently, a point cursor 22 will appear on the screen 11 of the monitor television shown in FIG. 15, and the operator may actuate operating keys while looking at the pattern on the screen, to move the point cursor 22 to a selected apex location. When the 'point key' is operated, the location of the apex point where the cursor 22 is located will be stored in memory. The cursor 22 should then be moved to the next adjacent apex point location along the perimeter of the polygon, and the 'point key' should be operated again. The CPU will then linearly interpolate the preceeding and present locations of the apex points, using an interpolating operation to obtain data on the coordinates of picture elements on the frame of the window by effectively connecting the apex points with straight lines. When the cursor 22 is in the last apex location (after setting up more than two points), and when the "loop" key is actuated, the locations of the first and last points are interpolated by the algorithm to complete the window.

Figure 15:
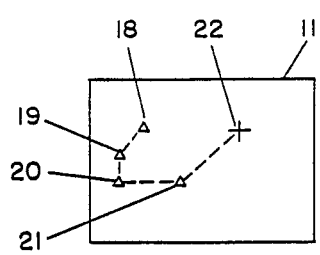
FIG. 15 is a plan view of a monitor television screen illustrating operation of the present invention.
Figure 16:
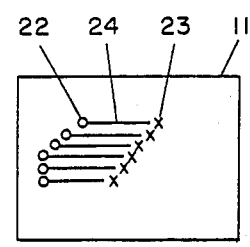
FIG. 16 is a diagram showing the generation of a window according to the present invention.

During the apex point specifying operation, the monitor screen as shown in FIG. 15 will start to display a window according to the window generating concept shown in FIG. 16 as the result of points 18, 19, 20, 21 having been set up in sequence.

As shown in FIG. 16, a generated window has a flat, uninterrupted, continuous line or period 24 from a window open point 22 to a window close point 23. The point data is inputted from the keyboard in such a way as is shown on the monitor screen in FIG. 15 to form one horizontal scanning line as a unit. The RAM (not shown) in the window pattern generator 3A of FIG. 13 will store data representing the window open point 22 and window close point 23 appearing on the bus B. After the data on windows are stored in the binary data memory 4, window output signals will be generated from the window pattern generator 3A in synchonism with the composite synchronizing signal from the video camera.

Figure 17:
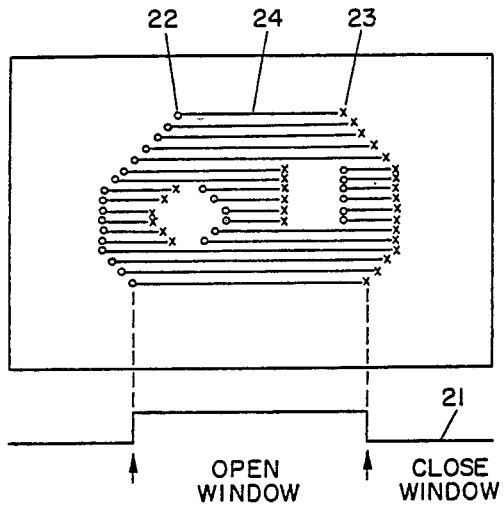
FIG. 17 is a plan view of a multi-window area created using the present invention.

Moreover, as shown in FIG. 17 which illustrates a multi-window, it is possible according to the present invention to mask a particular portion within the window by setting up a second window loop inside a first larger window loop which has been set up previously. Accordingly, virtually any number of smaller window loops may be set up within the external perimeter of a first larger window. Further, even smaller loops may be formed within the small window loop. Therefore, even if a plurality of large and small loops are formed, window open points 22 and the window close points 23 will be set up sequentially and repeatedly on a scanning line basis.

Figure 18:
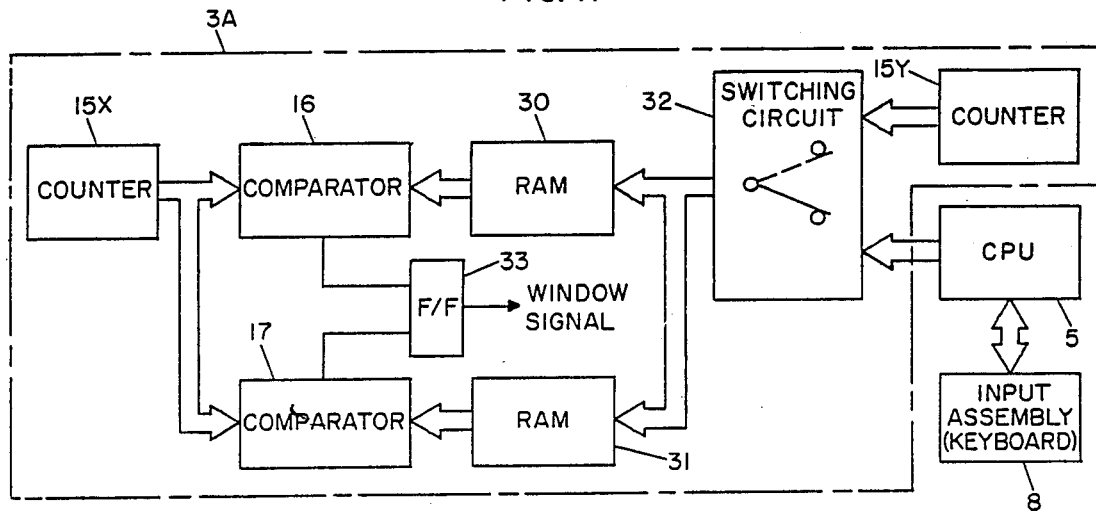
FIG. 18 is a block diagram further illustrating the window pattern generator of FIG. 13.

FIG. 18 is a block diagram illustrating in more detail the window pattern generator 3A of FIG. 13. FIG. 18 shows an X direction counter 15X, a Y direction counter 15Y, comparators 16, 17, RAMs 30, 31, a switching circuit 32, and a flip-flop 33.

During operation of this illustrated circuit, the abscissas of the window open point and window close point obtained by CPU 5 through computation on each scanning line are separately stored in respective RAMs 30 and 31 only when the switch in the switching circuit 32 is in the lower position as shown by the continuous line. Subsequently, the switching circuit 32 is switched to the location shown by the upper dotted line. When the Y counter 15Y generates ordinate position data sequentially in the Y direction on the screen of the monitor television, the abscissas of the window open point and the window close point will be read out of RAM 30 and RAM 31, respectively. The abscissa window open and close point data read out are compared in the comparators 16, 17 with the X coordinate signal from the X counter 15X which indicates the actual abscissa scanning position. If the abscissa data in the comparator 16 conforms, a first coincidence output sets the flip-flop 33, but if the data conform to each other in the comparator 17, indicating the end of a window region or the beginning of an "inner" window mask, a second coincidence output resets the flip-flop 33. Thus the output from the flip-flop 33 can be used as a window signal, the binary or digital state of which will indicate when the scanning position is presently in or out of a window region, a window mask or sub-mask window.

Figure 1:
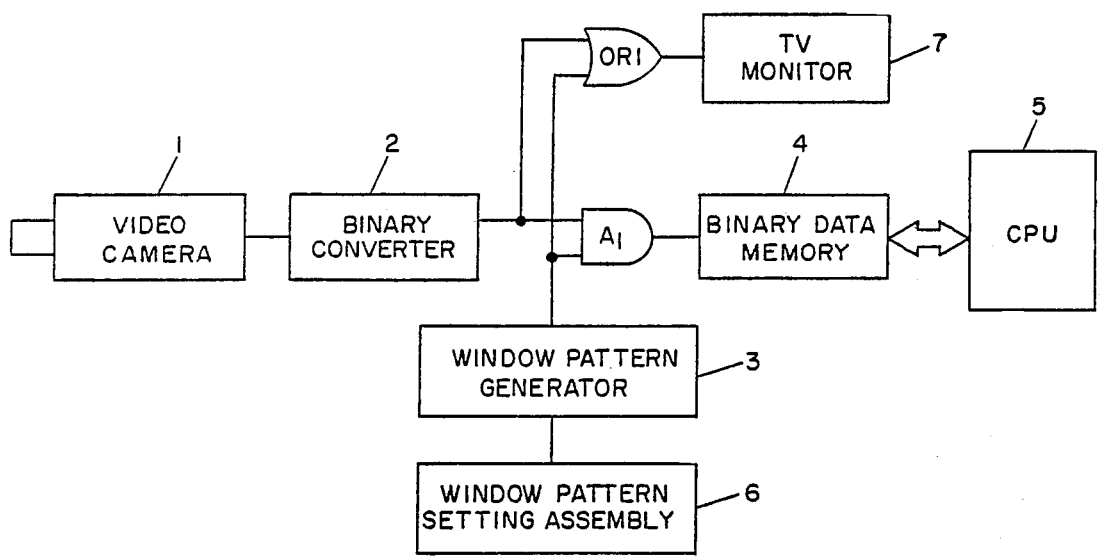
FIG. 1 is a block diagram illustrating the arrangement of a conventional pattern discriminator with a video camera.
Figure 2:
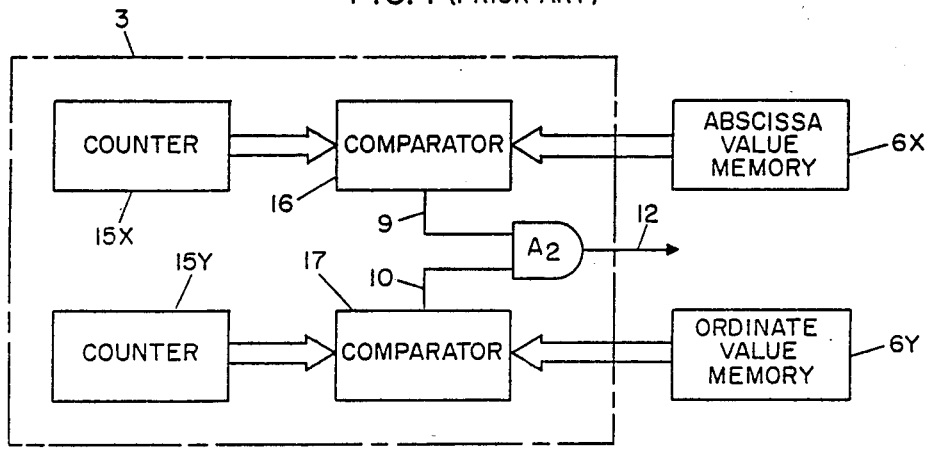
FIG. 2 is a detailed block diagram further illustrating a conventional window pattern generator of FIG. 1.
Figure 3:
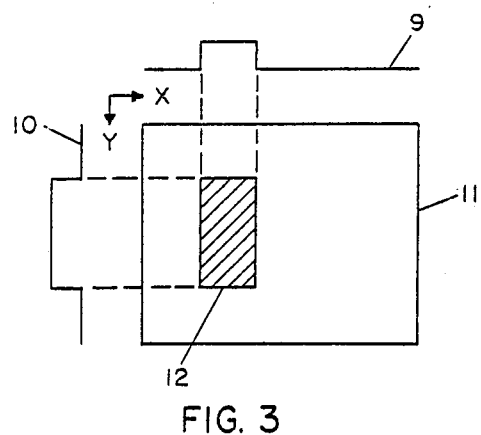
FIG. 3 is a plan view of the field of view of a monitor television and window region therein.
Figure 4:
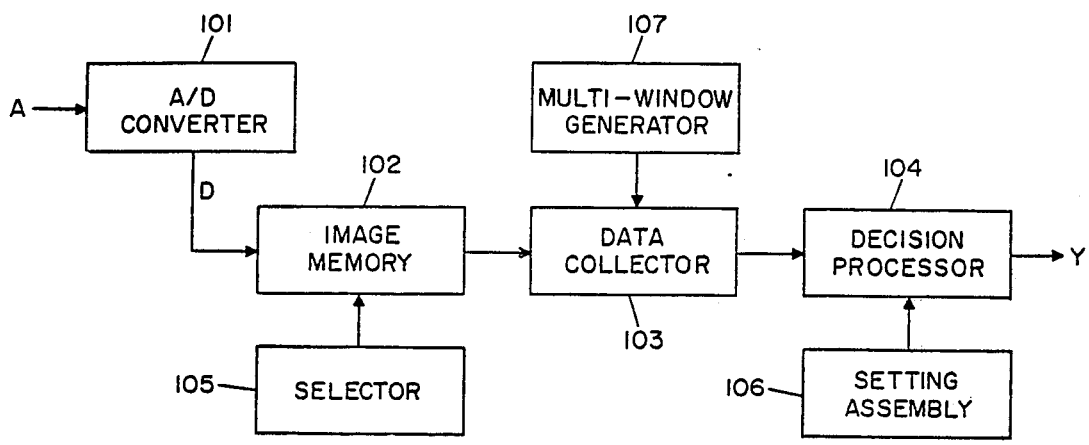
FIG. 4 is a block diagram illustrating another example of a conventional pattern discriminator.
Figure 5:
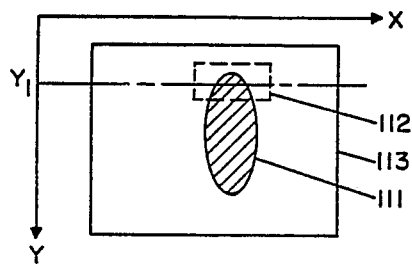
FIG. 5 is a plan view of a field of vision of an iTV camera.
Figure 6:
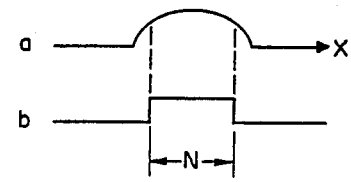
FIG. 6 is a waveform chart of an output obtained by horizontally scanning the field of FIG. 5 along the ordinate Y1.

The description of means for detecting and correcting the amount of shifting or slipping experienced by an optical image will be given with reference to FIG. 19 which is a block diagram illustrating another example of the present invention. The difference between the arrangement shown in FIG. 19 and that shown in FIG. 4 is a shifting or slipping detector and correcting assembly 109 which detects the amount of shift of the image based on the binary signal D from the A/D converter 101 and sends a correction output in proportion to the amount of shift to the multi-window generator 107 in order to correct the location of the window set up by the multi-window generator 107.

Figure 19:
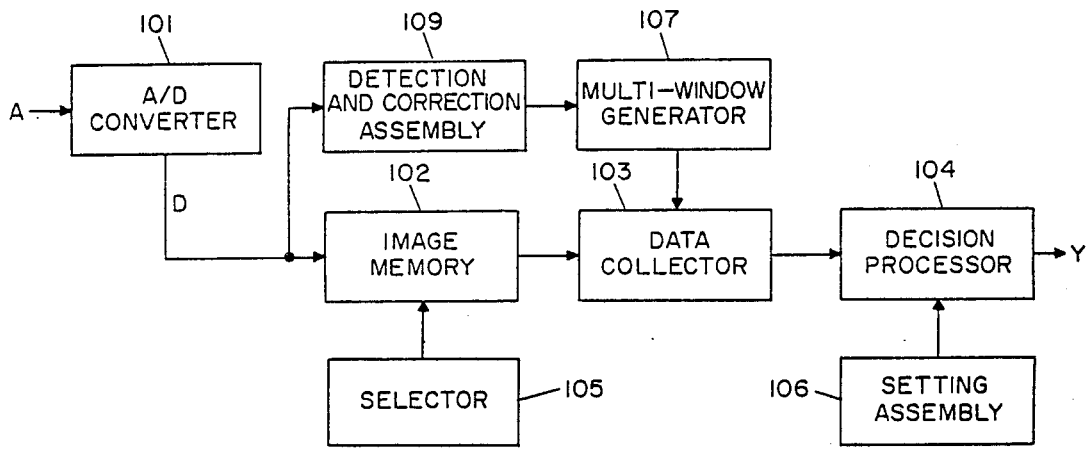
FIG. 19 is a block diagram illustrating another example of a pattern discriminator according to the present invention.
Figure 20:
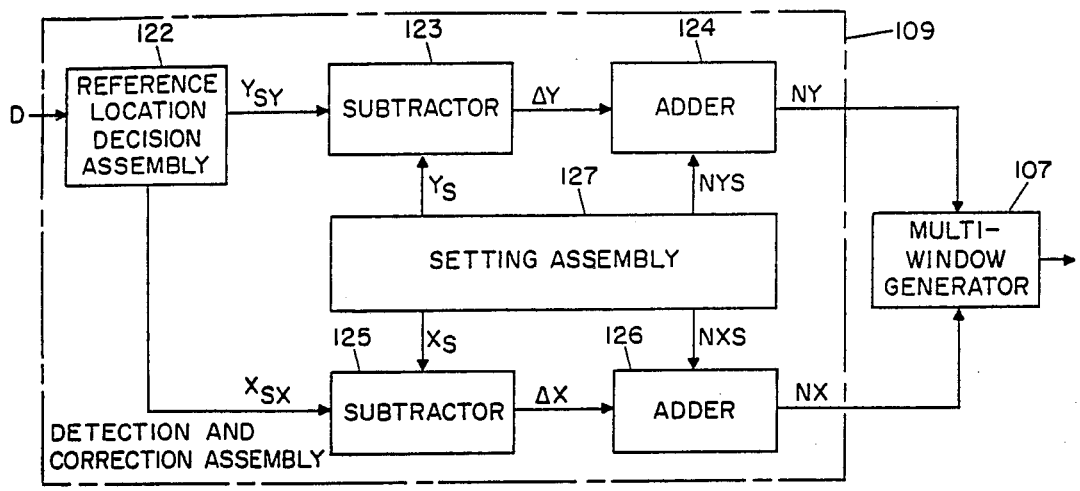
FIG. 20 is a block diagram further illustrating an assembly for locating, detecting and correcting shifting or slipping according to the present invention.

FIG. 20 illustrates the detection and correction assembly 109 of FIG. 19 in greater detail. In FIG. 20, the assembly 109 comprises a reference location decision assembly 22, subtractors 123, 125, adders 124, 126, and a setting assembly 127.

Figure 21:
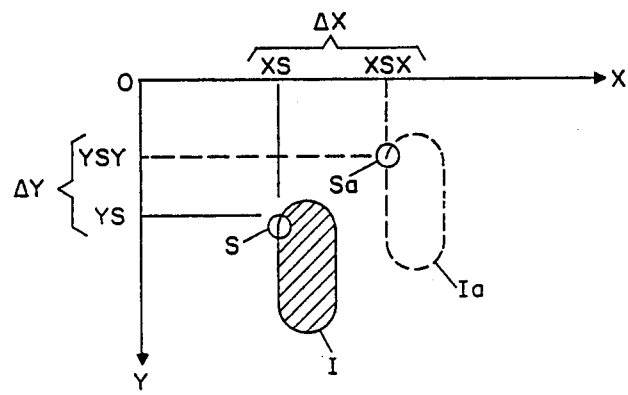
FIG. 21 is a plan view of a picture area for illustrating the principle of locating, detecting and correcting shifting or slipping according to the present invention.

Before giving a description of the operation of the circuit in FIG. 20, the principle of operation will first be described with reference to FIG. 21. When the image of the object I is in the preset location within a field of vision of the camera represented by two-dimensional ordinate and abscissa coordinates, it is assumed that the ordinate Ys and abscissa Xs represent the image of the object at a reference location S. However, since the image I is seen to have moved or shifted within the picture plane to the location Ia, a reference location Sa for the new location Ia of the image is obtained from the binary output D of an analog signal from the iTV camera by scanning the image. The location can be detected by detecting when the binary output changes from black to white on the edge of the image Ia, or by the use of other known methods.

When the reference location Sa is determined, the difference $\Delta X = |XSX - XS|$ between the abscissa XSX and the reference abscissa XS, and the difference $\Delta Y = |YSY - YS|$ between the ordinate YSY of Sa and the reference ordinate YS are obtained by computation. If the abscissa and ordinate of the window signal originally set up in the multi-window generator 107 and sent from the generator are respectively NXS and NYS, additional computation steps such as $\Delta X + NXS = NX$ and $\Delta Y + NYS = NY$ are carried out. The results of the additions NX and NY are set up in the multi-window generator 107, to allow the results to be generated as the output of the window signal. Thus, the set position of the window can be correct depending on the amount of shift of the object's image.

Referring again to FIG. 20, the setting assembly 127 is provided with abscissa NXS and ordinate NYS of the window signal normally given by the multi-window generator as preset data, (in addition to the abscissa XS and ordinate YS of the original reference location S) and supplies this preset data to the subtracters 123, 125 and adders 124, 126 as shown in FIG. 20.

The subtracter 123 carries out a subtraction of $|YSY - YS|$ and applies the result $\Delta Y$ to the adder 124. The adder 124 carries out an addition of $\Delta Y + NYS$ and sets up the result NY in the multi-window generator 107. In the same way, the subtracter 125 carries out a subtraction of $|XSX - XS|$ and applies the result $\Delta X$ to the adder 126. The adder 126 carries out an addition of $|X + NXS|$ and sets up the result NX in the multi-window generator 107.

Figure 7:
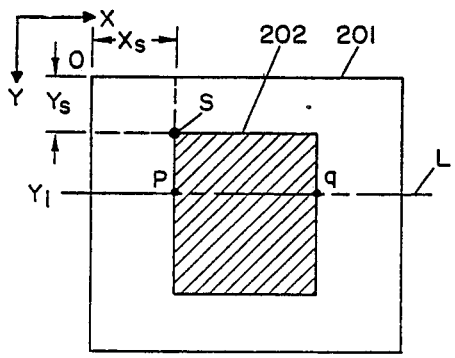
FIG. 7 is a plan view of another picture area.
Figure 8:
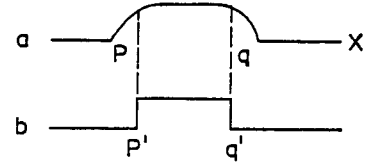
FIG. 8 is a waveform chart illustrating the waveform of a pickup signal from scanning the picture of FIG. 7 with the result coverted into a digital or binary value.
Figures 1, 9:
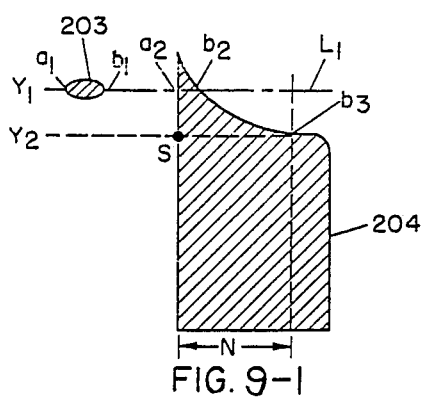
Figures 2, 9:
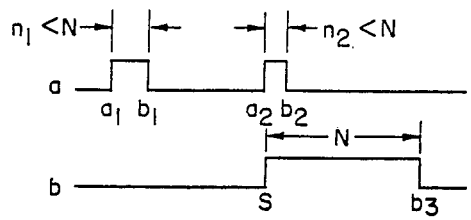
Figure 10:
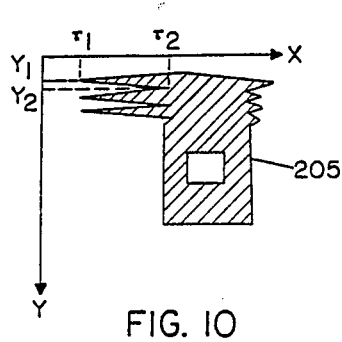
FIGS. 10 and 11 are plan views illustrating the shapes of the images of various objects for explaining the drawbacks of the prior art.
Figure 11:
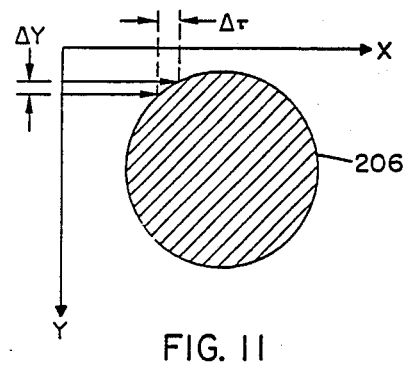
Figure 12:
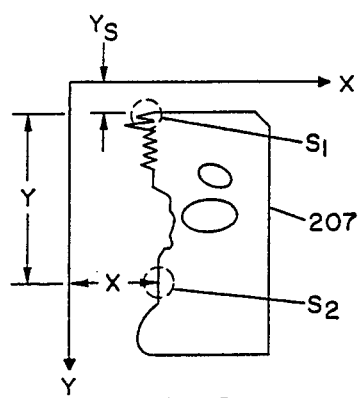
FIG. 12 is a plan view illustrating the shape of object's image for explaining the principle of operating a prior reference location decision apparatus.
Figure 22:
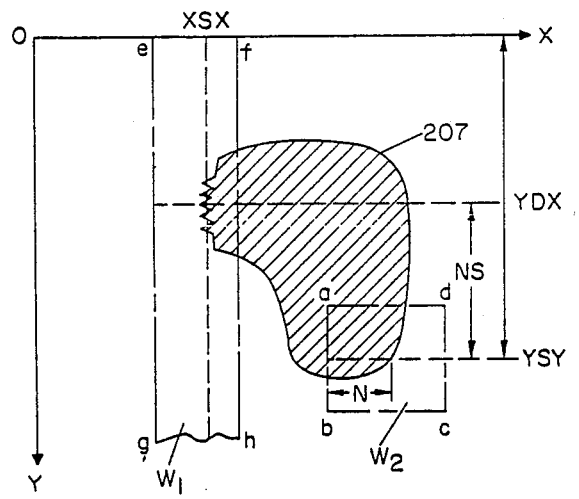
FIG. 22 is a plan view of a picture area similar to that of FIG. 12 for explaining an operating principle according to the present invention.

The description of means for determining the reference location in the optical image will be given with reference to FIG. 22, which is an explanatory diagram similar to FIG. 7 illustrating the principle of operation according to the present invention. The window region W2 (a, b, c, d) and the window region W1 (e, f, g, h) are set up in the suitable locations for determining the abscissa and ordinate as shown in FIG. 22, respectively.

In the window region W2, the length of a segment obtained by scanning the image 207 in the direction of the abscissa axis (for instance, N on the ordinate YSY) is measured. In this case, it is assumed that the vertical scanning moves from downward to upward in the window region W2. When the value N first exceeds a preset threshold level and continues to exceed the threshold level on four adjacent ordinate scanning lines, the fourth ordinate is defined as the ordinate of the reference location. The reason for using four ordinates is that noise-resistance is minimized for a plurality of ordinates. However, the number is not limited to four. The threshold level should be selected with consideration to the shape of the image.

After the reference ordinate YSY has been defined, an ordinate YDX separated from the ordinate YSY by a predetermined distance NS is selected depending on the shape of the image and the like. The output of the horizontal scanning obtained by scanning the image within the window region W1 to obtain the abscissa of a leading point at the edge of the image. The abscissa of a plurality of leading points on adjacent scanning lines centered on YDX within the window region are obtained and the mean value will be defined as the abscissa of the reference location. Accuracy is improved by using a mean value. In the preferred embodiment, eight adjacent scanning lines are used, but a different number may be selected. Should there be no image on a particular scanning line, the number of scanning lines used in computing the average should be reduced to that extent. Depending on the method of selecting the window regions W1, W2, any location within the image can be selected as the reference location, and the coordinates of the reference location can be defined with accuracy.

Figure 23:
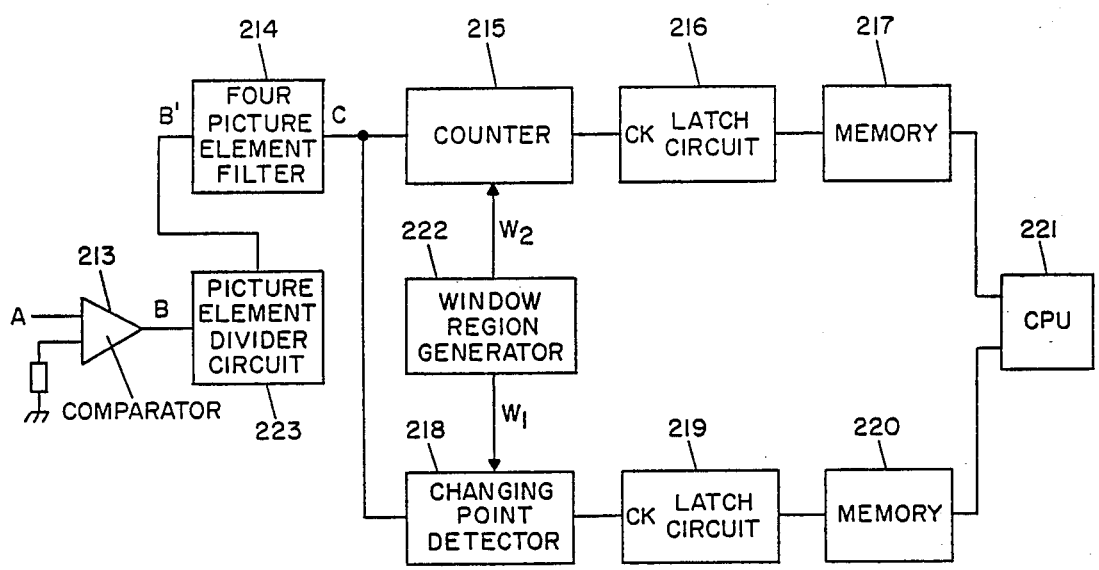
FIG. 23 is a block diagram illustrating another example of a pattern discriminator according to the present invention.

FIG. 23 is a block diagram which illustrates another example of the present invention. The apparatus comprises a comparator 213 for binary conversion, a four picture element filter 214, a counter 215, a latch circuit 216, a memory 217, a changing point detector 218, a latch circuit 219, a memory 220, a CPU 221, a window region generator 222, and a picture element divider circuit 223.

During operation, the output of an analog signal A from the iTV camera is applied to the comparator 213 and converted into a binary value using a properly set up threshold level, and then sent through the picture element divider circuit 223 to the picture element filter 214. The four picture element filter 214 is a digital filter generating an output only when there are four picture elements continuously at a high level. By providing a filter of this kind, noise consisting of less than four picture elements can be removed.

Using the output C from the four picture element filter 214, the ordinate YSY and abscissa XSX of the reference location in the object to be examined (image) can be obtained. The output of the signal C given by the four picture element filter 214 is sent to both the counter 215 and changing point detector 218. The signal for preparing the window W2 shown in FIG. 22 is supplied from the window region generator 222 to the counter 215, and only the image signal within the window W2 is applied to the counter 215. As aforesaid, the windows W1 and W2 may be set up at a location such that the image may be taken accurately. The counter 215 is used to count the number of picture elements of the image in the window W2 on a scanning line basis, and the value is latched by the latch 216. The latched data are given to the memory 217 at the end of a scanning line.

After an image equal to one picture area is scanned, the data are utilized in CPU 221 for obtaining the ordinate YSY of the reference location according to the principle mentioned above. Moreover, the signal for preparing the window W1 shown in FIG. 22 is also applied to the changing point detector 218 from the window region generator 222 and only the image signal within the window W1 is sent to the changing point detector 218. By scanning the image in the window W1 on a scanning line basis, the changing point detector 218 is employed to obtain the abscissa of a point where white changes into black and make the latch 219 hold the data, which are then written in the memory 220 on a scanning line basis. After one picture area has been scanned, the data are used to obtain the abscissa XSX of the reference location in CPU 221 according to the above principle.

As has been described, the present invention provides a window setting data input assembly of the manual key type; a window setting assembly for directly setting up apex points of windows while confirming pattern data by the use of a video monitor display; interpolating correction between a point to be set up and what has been set up so that any polygonal windows of triangular, semi-circle and other shapes and those of multipolygonal shapes; and an interactive method which makes it possible to readily change windows. In addition, since the window of a pattern discriminator is readily changeable, the discriminator can be employed on production lines on which various kinds of patterns are examined, and the alteration of facilities may be carried out even by end users. Also, if the image of an object being examined shifts from a preset location within the vision of a camera, the location for setting up a multi-window can be corrected. Therefore, data on the characteristics required for examining the image of the object can always be available and a decision can be made using more reliable data. Also, a reference location for setting up a window region of an image being examined can be defined with accuracy.

From the foregoing, it will be observed that numerous variations and modifications may be effected without departing from the true spirit and scope of the novel concept of the invention. It is to be understood that no limitation with respect to the specific apparatus illustrated is intended or should be inferred. It is, of course, intended to cover by the appended claims all such modifications as fall within the scope of the claims.

What is claimed is:

1. In a pattern discriminator which receives scanning data obtained by scanning an object within a defined window region with a photoelectric converter of the two-dimensional scanning type, and having means for converting the scanned data into pixel binary data representing characteristics of the object scanned by using a threshold value, and having means for evaluating the binary data in accordance with predetermined criteria and for producing an output signal indicative of said evaluation, the improvement comprising means for detecting a positional shift of an object being scanned relative to the position of a reference object comprising:

means for detecting the scanning position of reference coordinates for an object being scanned, comprising means for obtaining a first value related to the position of the first scanning line where the length of the scan of said object along a plurality of a first group of adjacent scanning lines within a first reference window exceeds a first threshold level, and for obtaining a second value related to the average length of the scan of said object along a plurality of a second group of adjacent scanning lines within a second reference window; and means for obtaining the difference between the reference position of said object as indicated by said first and second values and a corresponding reference position of a reference object, whereby the difference obtained is used to shift the defined window regions used for obtaining scanning data.

2. The pattern discriminator according to claim 1 wherein the number of adjacent scanning lines in said first group is four.

3. The pattern discriminator according to claim 1 wherein the number of adjacent scanning lines in said second group is eight.

4. The pattern discriminator according to claim 1 wherein the distance between the first scanning line in said first group and the first scanning line in said second group is approximately equal to a predetermined value.

5. The pattern discriminator according to claim 1 further including means for computing the new locations of the defined window regions in response to the difference between the reference positions of the object and the reference object and the window region positions for said reference object.

* * * * *